L. E. CONNER.
CLUTCH MECHANISM.
APPLICATION FILED JUNE 4, 1918.
1,415,150.
Patented May 9, 1922.
3 SHEETS—SHEET 1.
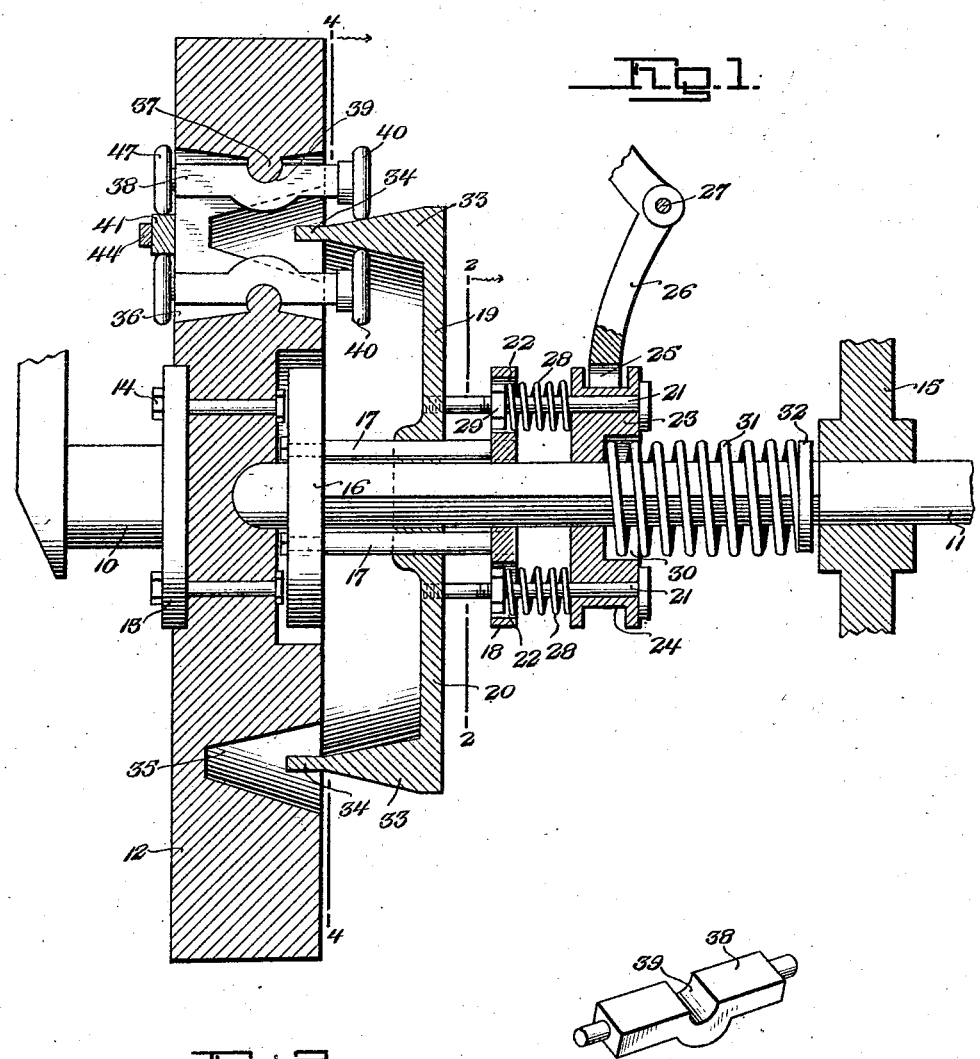

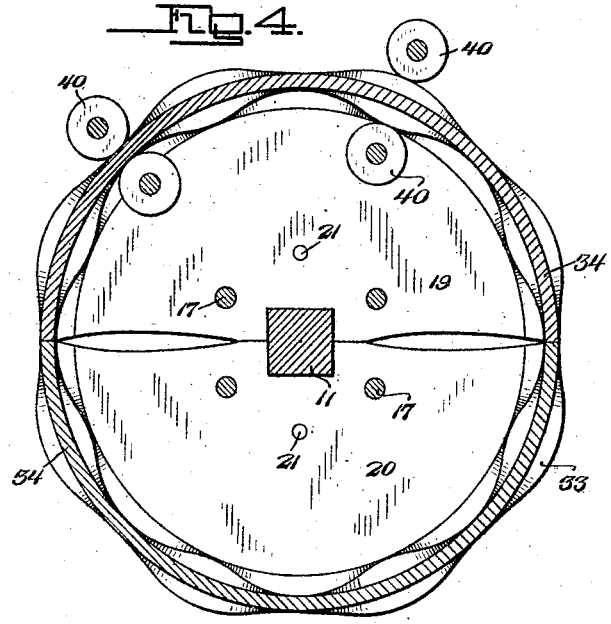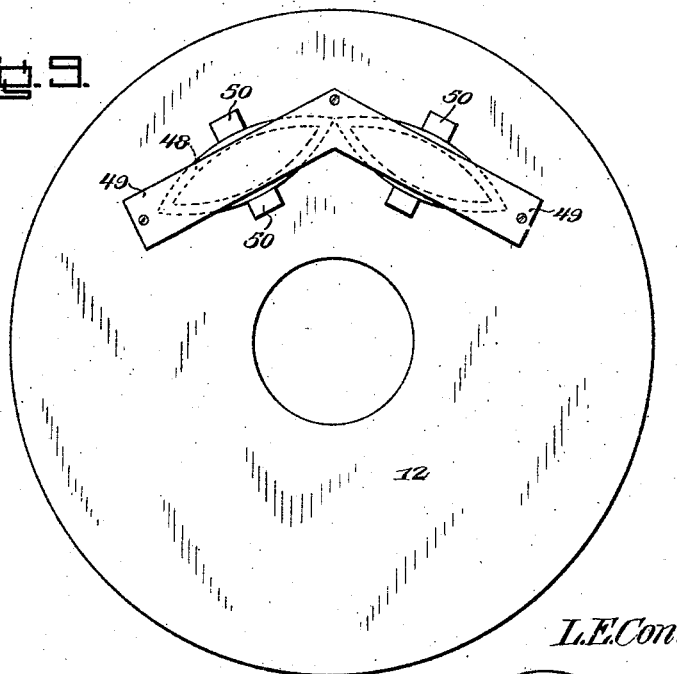

L. E. CONNER.
CLUTCH MECHANISM.
APPLICATION FILED JUNE 4, 1918.
1,415,150.
Patented May 9, 1922.
3 SHEETS—SHEET 3.
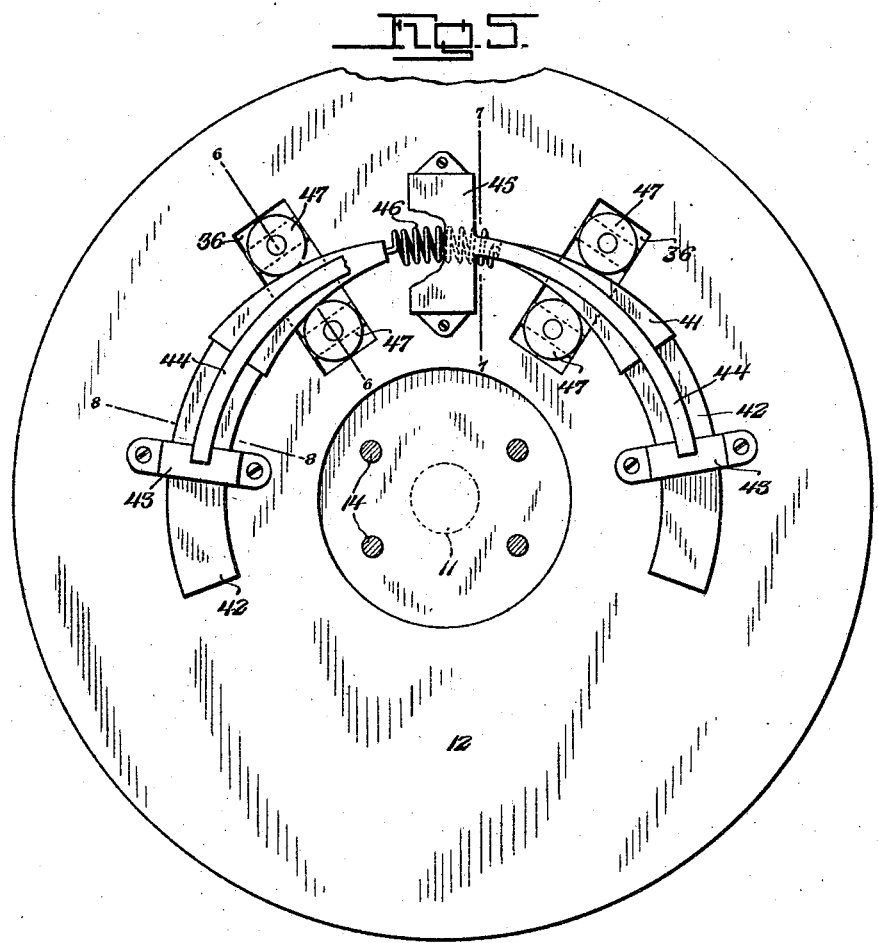
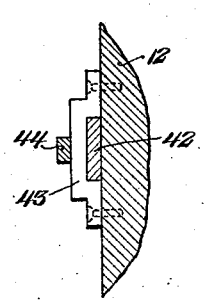
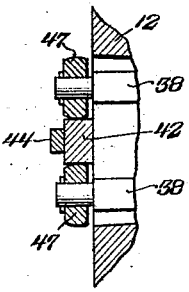
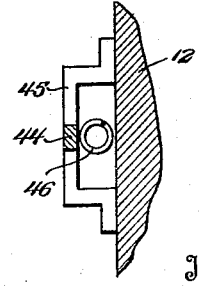
Inventor
L. E. Conner

UNITED STATES PATENT OFFICE.

LAWRENCE E. CONNER, OF JACKSON, MICHIGAN.

CLUTCH MECHANISM.

1,415,150.  Specification of Letters Patent.  Patented May 9, 1922.

Application filed June 4, 1918. Serial No. 238,211.

*To all whom it may concern:*

Be it known that I, LAWRENCE E. CONNER, a citizen of the United States, and a resident of Jackson, in the county of Jackson and State of Michigan, have invented a certain new and useful Improvement in a Clutch Mechanism, of which the following is a specification.

The present invention relates to clutches, and has more particular reference to that type adapted for use between drive and driven shafts, such as employed in motor vehicles.

An object of the present invention is to provide a clutch mechanism of this type where there is preferably no end thrust when the parts are engaged, and when the parts are being moved into interlocking position; wherein the inert effect of the driven member is relatively slight; wherein the interlocking of the parts is automatically controlled and is gradual regardless of how suddenly the control lever is released so that the force applied to the driven shaft is taken up smoothly and gradually without jerking or vibration; a clutch which always delivers a given predetermined force at a given engagement and at a given speed of the drive member, regardless of climatic and other conditions; a clutch wherein the parts may be interlocked with ease as each part of the driving member shifts independently of the other and when transmitting no power; and a clutch wherein with a given speed of the drive member, torque transmitted is proportional to amount of engagement.

The invention also aims at the provision of a clutch mechanism embodying the above advantages and which is of all metal construction, eliminating leather, fabric or other friction substances usually employed and which overheat, slip, char and rapidly wear out; and a clutch mechanism which is strong and durable and operates constantly in an oil bath.

The above, and various other objects and advantages of this invention will be in part understood, and in part become apparent, from the following detailed description of the present preferred embodiment, the same being illustrated in the accompanying drawings, wherein:

Figure 1 is a longitudinal section taken through a clutch mechanism constructed according to the present invention.

Figure 2 is a fragmentary transverse section through the same taken substantially on the plane indicated by the line 2—2 in Fig. 1 and disclosing one of the supporting collars for the coupling member.

Figure 3 is a detail perspective view of one of the rocker arms employed.

Figure 4 is a transverse section taken through the clutch mechanism in the plane indicated by the line 4—4 in Fig. 1, and disclosing the inner side of the coupling member and the adjacent ends of the rocker arms adapted to grip the same.

Figure 5 is an elevation of the outer side of the cam wheel or member carried upon the drive shaft, showing the controlling devices for the gripping arm.

Figure 6 is a detail sectional view through one of the controlling devices taken on the plane indicated by the line 6—6 in Fig. 5, and showing the shiftable wedge and arranged between the outer ends of the rocker arms.

Figure 7 is a similar view taken substantially on the plane indicated by the line 7—7 in Fig. 5, and showing the guard support and spring employed in connection with the tension means.

Figure 8 is a like view taken substantially on the plane indicated by the line 8—8 in Fig. 5, and showing one of the guiding straps and guard supports for the tensioning means.

Figure 9 is a view similar to Fig. 4 disclosing a slightly modified form of the means for regulating the gripping of the coupling member.

Referring to the drawings by numerals, 10 and 11 designate respectively drive and driven shafts which may be the crank shaft of an internal combustion engine, and a transmission shaft. The drive shaft 10 is provided with a fly wheel 12 secured to the shaft 10 by a collar 13 integral with the shaft and transverse bolts 14 clamping through the collar or flange and the fly wheel. The shafts 10 and 11 are arranged in axial alignment, and the adjacent end of the driven shaft 11 is preferably stepped in the inner face of the flywheel 12 and fitted with a combination thrust bearing or support for the driven shaft. An outer bearing or support 15 is provided for the driven shaft 11 and is spaced from the flywheel 12.

The portion of the driven shaft 11 between the flywheel and the bearing is noncircular in cross section, preferably rectangular as shown, and the shaft 11 is provided near its inner end with a fixed collar or plate 16 to which are secured the ends of opposed pairs of guide rods 17 which extend longitudinally of the driven shaft 11 at opposite sides thereof. The guide rods 17 are shouldered and have their reduced end portions engaging through the collar 16 and held thereto by clamping bolts or the like. The other ends of the rods 17 are preferably screw-threaded and are detachably engaged in a second plate or collar 18 provided with an axial non-circular opening adapted to receive the driven shaft 11 therethrough.

The guide rods 17 carry a coupling member comprising diametrically opposed disc sections 19 and 20 which, together, form a complete disc of circular contour adapted to surround the driven shaft 11. The inner end of each of the sections 19 and 20 is enlarged to form a hub portion and is apertured to receive the rods 17 therethrough. The sections 19 and 20 of the coupling member are adapted to independently slide longitudinally of the rods 17 and of the shaft 11 toward and from the flywheel 12. Each section 19 and 20 of the coupling member is provided with an outwardly extending connecting rod 21 which is threaded or otherwise secured at one end to the adjacent section, and which extends longitudinally of the driven shaft 11 and through relatively large openings 22 formed in the outer plate or collar 18. A shifting collar 23 is slidably mounted upon the driven shaft 11 and is adapted to turn therewith, and is provided with transverse openings in register with the rods 21 to receive the same therethrough. The rods 21 are headed upon their outer ends adapted to engage the outer surface of the shifting collar 23 for drawing the rods 21 outwardly when the shifting collar is slid longitudinally upon the shaft 11 away from the flywheel 12. The collar 23 is provided with the usual annular groove 24 within which engages a fork 25 of a shifting lever 26, which latter may be pivoted at 27 in any suitable manner. A spring 28 surrounds each rod 21 and engages at one end against the inner side of the shifting collar 23 and at its other end against an adjustable washer or nut 29 which is mounted upon the inner end of the rod 21. The springs 28 are adapted to normally hold the shifting collar 23 against the heads of the rods 21. The springs 28 also form means for yieldingly holding the collar 23 for movement in a direction towards the coupling member, and are adapted to urge the coupling member toward the fly wheel 12 when the shifting collar 23 is advanced toward the flywheel 12. The shifting collar 23 is provided with a spring seat 30 in its outer face adapted to receive the adjacent end of a main spring 31 which surrounds the driven shaft 11 and which bears at its other end against a collar or shoulder 32 formed upon the driven shaft near the bearing or support 15. The coupling member is provided with a laterally extending annular wedge 33 in the form of a flange which is provided with interior and exterior surfaces. The annular wedge 33 tapers inwardly from the disc or body of the coupling member toward the flywheel 12, and is provided at its free edge portion with a concentric flange part 34, the inner and outer faces of which are preferably cylindrical and concentric. The wedge 33, however, has its inner and outer faces of substantially frusto-conical cross sectional shape, as shown in Fig. 1, the faces diverging toward the body part of the coupling member and forming a wedge extending longitudinally of the driven shaft 11. The coupling member has its annular wedge 33 provided with spaced depressions formed in the inner and outer faces of the annular wedge 33, the depressions registering and being uniformly spaced apart to provide circumferentially extending wedges for a purpose hereinafter set forth. The wedges 33 therefore have operating or cam faces in register with each other and which are inclined in a direction of the axis of the clutch and also circumferentially with respect to the coupling member. The flywheel 12 is provided in its inner face with an annular outwardly flaring groove 35 adapted to receive the wedge 33 therein when the coupling member is advanced toward the flywheel.

The flywheel 12 is provided, at one side of the drive shaft 10 with a pair of circularly spaced apart radially extending slots 36 substantially rectangular in contour and extending entirely through the flywheel. The slots 36 intersect the annular groove 35 formed in the inner face of the flywheel, and pivot lugs or projections 37 are formed in the opposite ends of the slots 36 between the faces of the flywheel. Pivotally mounted upon projections 37 are rocker arms 38 which, as shown in Fig. 3, are provided in one side with a depression 39 adapted to receive the projections 37. The face of the projection 37 is cylindrical, and the recess 39 is similarly formed to admit of the rocking of the arm 38 upon the projection. From Fig. 1, it will be noted that the inner walls of the slots 36 flare toward the opposite sides of the flywheel to clear the opposite ends of the arms 38 and admit of the free rocking thereof.

The inner ends of the arms 38 are provided with contact rollers 40 adapted to engage against the opposite faces of the annular wedge 33 and to ride over the cam faces thereof.

Means is provided for yieldingly separating the outer ends of each pair of arms 38 for urging the rollers 40 against the annular wedge 33. One means for accomplishing this result is shown in Fig. 5, and wherein the outer face of the flywheel 12 carries a pair of arcuate wedges 41 having their tapering ends adjacent each other and provided with relatively flat arcuate shanks 42 engaging through straps 43 secured to the face of the flywheel. The straps 43 are provided with guide rails 44 which are of arcuate form and which are adapted to engage against the outer faces of the wedges 41 for holding them against the flywheel. Between the adjacent ends of the wedges, the flywheel 12 is provided with a strap or housing 45 through which may project the reduced ends of the wedges 41, and which is adapted to house or cover a contraction spring 46 which is secured to the adjacent reduced ends of the wedges 41 and is adapted to urge the same together. The guide or retaining rails 44 may be connected to the housing 45, and may be integral therewith as shown.

The outer ends of the arms 38 are provided with rollers 47 which engage the opposite inclined edges of the wedges 41, and which under the action of the wedge 33 are adapted to force the arcuate wedges 41 away from each other.

As a modification of this means for holding the outer ends of the arms 38 apart, Fig. 9 shows the flywheel 12 with pairs of elliptic springs 48 supported upon a bracket 49. The outer ends of the arms 38 are provided with ears or projections 50 which bear directly against the outwardly bowed portions of the springs 48 for collapsing the springs to a more or less extent when the rollers 40 at the inner side of the flywheel are separated by the cam 33.

In both embodiments of the invention, the outer ends of the arms 38 are yieldingly held apart so as to bind the rollers 40 against the opposite faces of the cam 33 and thus cause the coupling member to gradually take up the course and rotation of the flywheel 12.

The cams formed on the annular wedge 33 are spaced apart a distance relative to the location of the pairs of rocker arms 38 to position one pair of the rollers 40 on the highest point of the cams while the other pair of rollers 40 is just beginning to engage the next adjacent cam. By this arrangement, a constant course or takeup is provided between the coupling member and the flywheel. This arrangement also eliminates jars, shock and vibration of the members so that the driven shaft 11 gradually and evenly takes up the speed of rotation and the course of the drive member 10.

In operation, the spring 31 normally urges the shifting collar 23 toward the flywheel. The springs 28 are compressed against the rods 21 and urge the same together with the coupling member toward the flywheel. As the coupling member is formed in two parts, the parts are permitted to advance independently of each other toward the flywheel and thus take up inaccuracies of alignment and gradually engage the coupling member between the rollers 40. Normally, the concentric flange 34 of the coupling member engages between the rollers 40 and holds the arms 38 apart at their inner ends sufficiently to retain the arms from displacement from the flywheel. When in this position, the spring 46 of the arcuate wedges 41 draws the wedges together and maintains the wedges under tension against the outer rollers 47 to hold the outer ends of the arms 38 apart and prevent vibration or displacement of the parts.

The springs 28 serve to yieldingly urge the coupling members 19 and 20 toward the flywheel, and cause the annular wedge 33 to gradually work in between the rollers 40 and raise the same upon the cam faces of the wedge. As the wedge 33 is advanced toward the flywheel, the pressure of the wedge is transmitted through the arms 38 and the rollers 47 and the latter gradually spread the arcuate wedges 41 apart sufficiently to receive the wedge 33 between the rollers 40. As the wedge 33 is advanced toward the flywheel, the pressure required for separating the rollers 40 is proportionately increased with the advance, with the result that when the flywheel 12 turns at a relatively low speed the coupling member need be advanced only a relatively short distance toward the flywheel to couple the wedge 33 therewith, and when the flywheel 12 is revolving at a relatively high rate of speed, the coupling member must be advanced to a greater extent toward the flywheel so as to overcome the inertia of the driven parts.

Pressure upon the upper end of the lever 26 swings the latter and moves the shifting collar 23 back against the tension of the spring 31. The heads of the rods 21 engage the collar 23 and the rods together with the coupling member are drawn back from the flywheel 12. As the annular wedge 33 is withdrawn from between the rollers 40, the spring 46 draws the arcuate wedges 41 together and the arms 38 are retained in place and are held from vibration.

When the parts of the clutch mechanism are in full driving relation, the arms 38 and rollers 40 are stationary relative to the cam surfaces of the coupling member and in wedged relation with the cam extension on the coupling members 33. Any tendency of oscillatory movement of the arcuate wedges 41 will be prevented by the contractile spring 46, which spring maintains a constant pressure between the arcuate wedges 41 and the rollers 47. The projections 37 act as fulcrums for the rocker arms 38 and they take up strain brought on the rocker arm by the cam elevations on the members 33, and if lubrication of these fulcrum projections is thorough, no binding effect will be produced between the rocking arm and fulcrum projections.

When the tension means of Fig. 9 is employed, the wedge 33 spreads the inner ends of the arms 38 apart and binds the projections 50 of the arms against the elliptic springs 48, compressing the latter to a more or less extent and transmitting the pressure of the springs through the arms to the wedge 33. The further the wedge 33 is advanced toward the flywheel, the greater will be the compression of the springs 48 with the result that the coupling member will take up the course and speed of rotation of the flywheel 12 proportionate to the rate at which it is rotated.

It is of course understood that various other modifications and changes may be made in the details of construction and design of the above specifically described embodiment of this invention without departing from the spirit thereof, the changes and modifications being restricted only by the scope of the following claims.

I claim:

1. In a clutch, the combination of drive and driven members, a flywheel carried upon the drive member, a shiftable coupling member mounted on the driven member, said coupling member having an annular wedge extending toward the flywheel, a pair of arms mounted on the flywheel, spring means yieldingly urging the arms together at their inner ends, said annular wedge being adapted to engage the inner ends of the arms to spread the same apart for yieldingly and gradually connecting the coupling member to the flywheel, and said annular wedge provided with registering circumferential rows of cams upon the inner and outer faces of the wedge adapted to receive the inner ends of said arms thereagainst.

2. In a clutch, the combination of drive and driven shafts, a fly wheel mounted on the drive shaft, a two-part coupling member mounted on the driven shaft and provided with an annular wedge projecting toward the flywheel, said wedge provided with a circumferential row of cams on the opposite faces of the wedge, spring pressed arms mounted on the flywheel and adapted to engage at one end against the opposite faces of the wedge, a spring carried by the driven shaft engaging the coupling member to advance the same toward the flywheel, independent spring elements arranged between said spring and the sections of the coupling member for independently advancing the same toward the flywheel, and releasing means connected to said sections for withdrawing the same from the flywheel and from engagement with said spring arms.

3. In a clutch, the combination of drive and driven shafts, a flywheel on the drive shaft provided with circularly spaced recesses at one side of the axis of the flywheel, pairs of arms seated in said recesses, means for yieldingly urging the outer ends of the arms apart, a coupling member mounted upon the driven shaft and provided with an annular wedge extending toward the flywheel, a spring on the driven shaft adapted to advance the coupling member toward the flywheel and bind said annular wedge between the inner ends of said arms, said annular wedge having a circumferential row of cams adapted to engage said arms for gradually connecting the coupling member to the flywheel, means for normally urging the coupling member toward the flywheel, and releasing means connected to the coupling member for retracting it from the flywheel.

4. In a clutch, the combination of drive and driven shafts, a flywheel mounted on said drive shaft and having a recess therein, a pair of arms carried by the flywheel in said recess, spring means for urging the inner ends of the arms together, a slidable two part coupling member mounted on the driven shaft, spring means for projecting the coupling member, independent spring means arranged between said spring means and the parts of the coupling member for moving said parts toward the flywheel, releasing means connected to said parts of the coupling member for withdrawing the same from the flywheel, an annular wedge connected to the coupling member and extending toward the flywheel, and having cam faces for engagement against the inner ends of the arms and adapted to yieldably and gradually force the arms apart, said recess in the flywheel being annular and adapted to receive said cam faces of the annular wedge therein.

5. In a clutch, the combination of drive and driven means, a flywheel mounted on said drive means, a pair of members supported by the flywheel, means for yieldably forcing the inner ends of said pair of members together, a slidable two part coupling member mounted upon the driven means, spring means adapted to project the coupling member toward the flywheel, independent spring means arranged between said first spring means and the parts of the coupling member to move said parts of the coupling member toward the flywheel, releasing means connected to said parts for withdrawing the same from the flywheel, wedging means connected to a part of the coupling member and projecting in the direction of the flywheel and being cammed for engagement against the inner ends of said pair of members to gradually force the said pair of members apart.

LAWRENCE E. CONNER.